(12) United States Patent
McClure

(10) Patent No.: US 10,378,571 B2
(45) Date of Patent: Aug. 13, 2019

(54) REMOVABLE, SINGLE SIDE FASTENER WITH ULTRA-LOW STACK HEIGHT GRIP RANGE, COMPONENTS, AND METHODS FOR MAKING AND USING THE SAME

(71) Applicant: Centrix Inc., Kent, WA (US)

(72) Inventor: Travis McClure, Kent, WA (US)

(73) Assignee: Centrix Inc., Kent, WA (US)

( * ) Notice: Subject to any disclaimer, the term of this patent is extended or adjusted under 35 U.S.C. 154(b) by 81 days.

(21) Appl. No.: 15/462,661

(22) Filed: Mar. 17, 2017

(65) Prior Publication Data

US 2017/0268552 A1 Sep. 21, 2017

Related U.S. Application Data

(60) Provisional application No. 62/309,890, filed on Mar. 17, 2016.

(51) Int. Cl.
| | | |
|---|---|---|
| *F16B 13/06* | (2006.01) | |
| *F16B 13/08* | (2006.01) | |
| *F16B 19/10* | (2006.01) | |
| *F16B 5/02* | (2006.01) | |
| *F16B 33/00* | (2006.01) | |

(52) U.S. Cl.
CPC .......... *F16B 13/063* (2013.01); *F16B 13/06* (2013.01); *F16B 13/0833* (2013.01); *F16B 19/109* (2013.01); *F16B 5/02* (2013.01); *F16B 19/1081* (2013.01); *F16B 33/002* (2013.01)

(58) Field of Classification Search
CPC ................ F16B 13/063; F16B 13/0833; F16B 19/1081; F16B 19/109; F16B 13/06

USPC .......................................................... 411/21
See application file for complete search history.

(56) References Cited

U.S. PATENT DOCUMENTS

| | | |
|---|---|---|
| 1,978,935 A | 10/1934 | Douglas |
| 2,370,336 A | 2/1945 | Wallace |
| 2,379,786 A | 7/1945 | Bugg et al. |

(Continued)

FOREIGN PATENT DOCUMENTS

| | | |
|---|---|---|
| EP | 0275160 A2 | 7/1988 |
| GB | 413403 A | 7/1934 |

(Continued)

OTHER PUBLICATIONS

ISA United States Patent and Trademark Office, International Search Report Issued in Application No. PCT/US2017/023070, dated Jun. 1, 2017, WIPO, 2 pages.

*Primary Examiner* — Roberta S Delisle
(74) *Attorney, Agent, or Firm* — McCoy Russell LLP

(57) ABSTRACT

A removable single side fastener with ultra-low stake height grip range is disclosed. The fastener includes a housing body, a threaded screw, a drive nut and a collet body. The housing body has a housing head portion and a shank portion extending from the housing head portion with the shank portion forming at least two longitudinal slots. The threaded screw, disposed within the housing body, has a head portion rotatably confined within the housing head portion. The drive nut is rotationally coupled to the threaded screw and rotationally constrained relative to the housing body. The collet body has a pair of collet body legs converging inwardly. Each collet body leg has a toe which may extends radially outward beyond the longitudinal slots to compress work pieces against the housing head portion for fastening.

11 Claims, 24 Drawing Sheets

(56) References Cited

U.S. PATENT DOCUMENTS

| | | | |
|---|---|---|---|
| 2,649,884 A | 8/1953 | Westover | |
| 2,775,155 A | 12/1956 | Tompkins et al. | |
| 2,936,015 A | 5/1960 | Rapata | |
| 2,988,950 A * | 6/1961 | Dempsey | E21D 21/008 405/259.3 |
| 2,994,242 A | 8/1961 | Buff et al. | |
| 3,469,493 A | 9/1969 | Fisher | |
| 4,015,505 A | 4/1977 | Murray | |
| 4,316,689 A * | 2/1982 | Sanchez Velasco | F16B 13/0833 411/60.2 |
| 4,501,520 A * | 2/1985 | Bergner | F16B 13/065 411/21 |
| 4,789,284 A | 12/1988 | White | |
| 5,065,490 A | 11/1991 | Wivagg et al. | |
| 5,344,257 A * | 9/1994 | Wright | E21D 21/008 405/259.1 |
| 5,704,752 A | 1/1998 | Logerot | |
| 5,803,689 A * | 9/1998 | Magnus | E21B 41/0007 24/607 |
| 6,174,118 B1 | 1/2001 | Rebers | |
| 6,287,044 B1 | 9/2001 | Huber | |
| 6,884,012 B2 * | 4/2005 | Panasik | F16B 13/0833 411/29 |
| 7,607,875 B2 * | 10/2009 | Shinozaki | F16B 19/1081 411/21 |
| 8,075,234 B2 * | 12/2011 | McClure | F16B 19/1081 411/55 |
| 8,132,435 B2 * | 3/2012 | Thomas | E05B 65/0021 70/95 |
| 8,486,120 B2 * | 7/2013 | Shimko | A61C 8/0074 411/55 |
| 2002/0144574 A1 | 10/2002 | Avetisian et al. | |
| 2005/0200066 A1 | 9/2005 | McClure | |
| 2007/0183864 A1 | 8/2007 | Shishikura | |
| 2007/0243037 A1 | 10/2007 | Pratt | |
| 2011/0008124 A1 | 1/2011 | Niklewicz et al. | |
| 2013/0014376 A1 | 1/2013 | Komsitsky et al. | |

FOREIGN PATENT DOCUMENTS

| | | |
|---|---|---|
| GB | 624714 A | 6/1949 |
| GB | 1548964 A | 7/1979 |
| JP | H1151018 A | 2/1999 |

* cited by examiner

REMOVABLE, SINGLE SIDE FASTENER WITH ULTRA-LOW STACK HEIGHT GRIP RANGE, COMPONENTS, AND METHODS FOR MAKING AND USING THE SAME

CROSS-REFERENCE TO RELATED APPLICATION

This application claims the benefit of U.S. Provisional Patent Application No. 62/309,890, entitled "Removable, Single Side Fastener with Ultra-Low Stack Height Grip Range, Components, and Methods for Making and Using the Same", filed on Mar. 17, 2016, the subject matters of which are incorporated herein by reference in its entirety.

TECHNICAL FIELD

This description relates generally to removable single side fasteners and more specifically to removable single side fasteners having low stack height grip range.

BACKGROUND

Fasteners are hardware devices that mechanically join or affix two or more objects together. In general, fasteners are used to create non-permanent joints, which can be removed or dismantled without damaging the joining workpieces. Fasteners may be used in hidden locations or visible locations. The fastener needs to be adaptive to fasten workpieces with various thicknesses. In certain situation, it is required no fastener head protrusion beyond the workpiece after fastener engagement.

Therefore, it is desirable to have fasteners and fastener assemblies having an adjustable grip range and a low-profile head.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The invention of this application is directed to removable single side fasteners having an ultra-low stack height grip range, and particularly to such fasteners having a low profile head on a proximal end of the fastener. Fasteners according to the invention compressionally associate at least a proximal work piece defining a proximal hole having a first diameter and a distal work piece defining a distal hole having a second diameter wherein at least a portion of a fastener will pass through both holes.

Fasteners or assemblies according to the invention include a generally cylindrical housing body having a head portion at a proximal end thereof and a shank portion extending distally there from, an outer shank diameter, an inner primary bore diameter and at least two substantially longitudinal slots formed in the shank portion that extend substantially the length of the shank portion, wherein the shank portion outer diameter is less than any work piece hole diameter. In many examples, the two longitudinal slots are in opposition, i.e., diametrically opposed. Moreover, various examples of the fasteners or assemblies include three or more slots, preferably circumferentially equidistant from each other.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawing.

DETAILED DESCRIPTION

Figure 1:
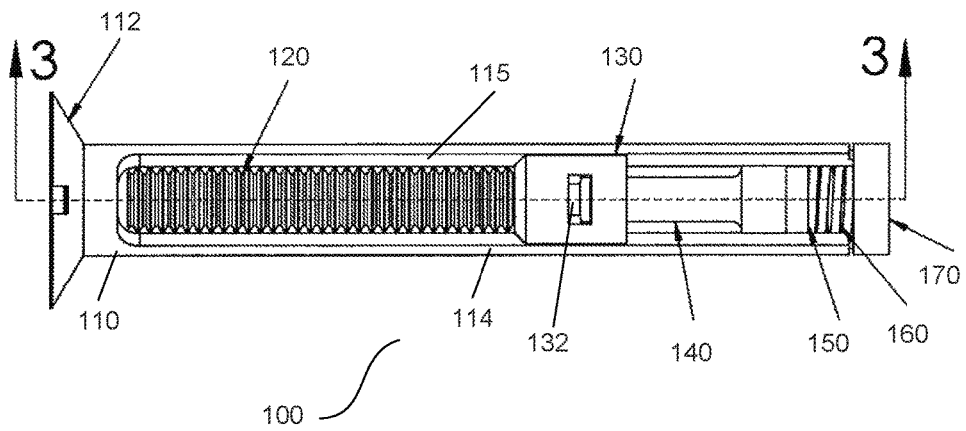
FIG. 1 is a first example of a removable single side fastener in a side view.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described examples will be readily apparent to those skilled in the art, and the generic principles disclosed herein may be applied to other examples and applications thereof without departing from the spirit and scope of the present invention, as defined by the appended claims. Thus, the claimed invention is not intended to nor should be limited to the disclosed and/or described examples, but is to be accorded the widest scope consistent with the principles and features disclosed herein.

The invention of this application is directed to removable single side fasteners having an ultra-low stack height grip range, and particularly to such fasteners having a low profile head on a proximal end of the fastener. Fasteners according to the invention compressionally associate at least a proximal work piece defining a proximal hole having a first diameter and a distal work piece defining a distal hole having a second diameter wherein at least a portion of a fastener will pass through both holes. For convention, the work piece adjacent to the head of the fastener is referred to as the proximal work piece and the work piece adjacent to the working end of the fastener is referred to as the distal work piece. Furthermore, the conventional mode of insertion is first through the proximal work piece hole and last through the distal work piece hole. Any number of intermediary work pieces may be present between the proximal and distal work pieces to create a stack.

Fasteners or assemblies according to the invention include a generally cylindrical housing body having a head portion at a proximal end thereof and a shank portion extending distally there from, an outer shank diameter, an inner primary bore diameter and at least two substantially longitudinal slots formed in the shank portion that extend substantially the length of the shank portion, wherein the shank portion outer diameter is less than any work piece hole diameter. In many examples, the two longitudinal slots are in opposition, i.e., diametrically opposed. Moreover, various examples of the fasteners or assemblies include three or more slots, preferably circumferentially equidistant from each other.

A threaded screw is inserted into the housing body. The screw has a head portion at a proximal end thereof and a reduced diameter portion (which may be threaded or non-threaded) at a distal end thereof. The head portion is preferably, but not necessarily, sized to fit into a recess formed at the head portion of the housing body and the screw length is preferably less than the length of the housing body so that when assembled, neither the proximal portion nor the distal portion extend beyond the ends of the housing body.

A driven nut is rotationally coupled to the threaded screw, when the fastener is assembled. The driven nut has an outer surface and an inner surface. The inner surface is adapted to rotationally couple with the threaded screw. The driven nut has a generally cylindrical form but that is rotationally constrained relative to the housing body, when associated therewith, by a first part of an anti-rotation means ("ARM") present on an exterior surface thereof. As will be detailed later, this first part of the ARM acts upon a second part of the ARM that forms part of the housing body.

In addition to the foregoing, the driven nut defines at least one pair of radially oriented through holes that are adapted to align with the housing body longitudinal slots, thus allowing the through holes to be exposed to the environment exterior of the collet body housing outer surface.

A collet body is operatively linked to the driven nut. The collet body includes a part of a collet body having a central axis and at least a first pair of collet body legs that converge towards the central axis when in a nominal state. Each leg, in turn, has an extending portion or toe, which extends generally radially from the axis of the collet body when the legs are in an axially congruent state. Each toe is sized to fit through a driven nut through hole, from the interior of the nut to the exterior. Thus, a portion of the collet body legs are also sized to fit interiorly of the driven nut.

In an assembled state, the distal, reduced diameter portion of the screw occupies the space between the converging legs such that the maximum outer diameter of the toes is equal to or less than the outer diameter of the driven nut when measured at a pair of through holes. When the nut is run up (towards the proximal end of) the screw, the greater diameter threaded portion of the screw is introduced into the space between the converging legs to cause further displacement there between, whereby the maximum outer diameter of the toes is greater than the outer diameter of the driven nut when measured at a pair of through holes. Preferably, this maximum outer diameter is also greater than the hole diameter of the distal work piece during compressional association of all work pieces.

Because in many examples the substantially longitudinal slots formed in the housing body extend to the distal end thereof, a cap or other termination element is preferably located at the housing body distal end to prevent unintentional loss of the collet body when the fastener is in an assembled state.

Furthermore, because the screw may incorporate a reduced diameter, non-threaded portion at a distal end thereof, it is possible for the driven nut to decouple from the screw when the nut is run down (toward the distal end of) the screw. To address this possible problem, a biasing element is presented between the housing body (which includes the cap if present) and the driven nut. In many examples, the biasing element, which may be a compression spring, is in compressional contact with the collet body, which in turn is in compressional contact with the driven nut, preferably via the interaction between the collet body toes and the driven nut through holes.

In another respect, the invention is directed to selected components found in assembled removable single side fasteners having an ultra-low stack height grip range. These components include housing bodies, collet bodies and driven nuts.

As previously described, housing bodies according to the invention have a generally cylindrical form, and include an outer diameter, an inner diameter and at least two substantially longitudinal slots formed therein, preferably opposed to one another and extending substantially the length of the housing body from a proximal end thereof to a distal end thereof. The slots create exposed sectional faces in the housing body, which form one part of a two-part ARM with respect one of the driven nut or the collet body (and preferably the driven nut). This form of an ARM is referred to herein as a sectional ARM. If maximum working range of the fastener is intended, it is desirable to have the slots (and therefore the resulting sectional faces) extend substantially the entire length of the housing body.

It should be noted, however, that the housing body ARM need not exclusively be located on the exposed sectional faces of the housing body; alternative or additional means for modulating driven nut to housing body relative rotation include using a non-circular cross section profile for the inner surface of the housing body (referred to herein as a surface ARM).

To facilitate assembly of the fastener and introduction of the collet body into the housing body, the distal end thereof may be open. In this manner, the collet body and optional biasing element, such as the compression spring, may be introduced into the housing body where after the assembly may be permanently (e.g., swaged, adhered, welded, etc.) or semi-permanently (e.g., screwed) closed with an end cap.

Depending upon applications, the proximal end of the housing body may have a beveled head so as to fit within a beveled recess formed in the proximal work piece. Therefore, an ultra-low profile or flush head temporary fastener can be created. Additionally, the beveled head can have a conventional cylindrical bore formed therein to receive a conventional cap head screw head. To prevent rotation of the housing body during clamping operations, one or more tool interfaces can be formed in the beveled head to receive a tool that will prevent unintentional rotation of the housing body.

With respect to methods for using temporary fasteners according to the invention, such methods include ensuring that the screw contacting portions of the collet body legs are in the reduced diameter portion of the screw such that the toes are in a retracted position; inserting the distal end of the fastener through all work piece holes; rotating the screw so that the driven nut is caused to translate towards the proximal end of the fastener, whereby the collet body legs are radially displaced, causing the collet body toes to transition to an extended position; and continuing to cause the driven nut to translate towards the proximal end of the fastener until compressive contact is made between the collet body toes and the distal work piece.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

Figure 2:
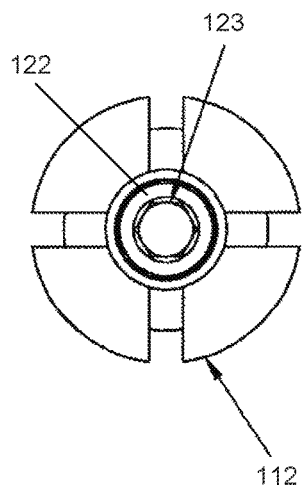
FIG. 2 is an end view from the fastener head view of the removable single side fastener showing in FIG. 1.
Figure 3:
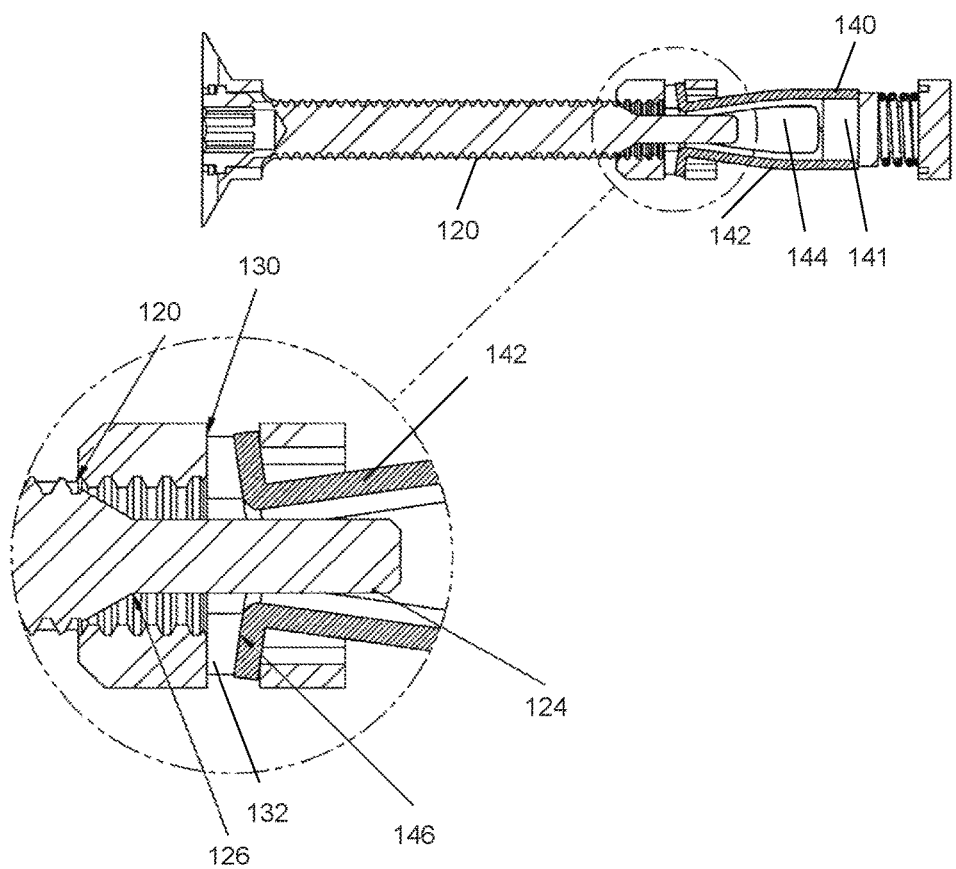
FIG. 3 is a cross-sectional view of the removable single side fastener showing in FIG. 1 with clamping feet not engaged.
Figure 4:
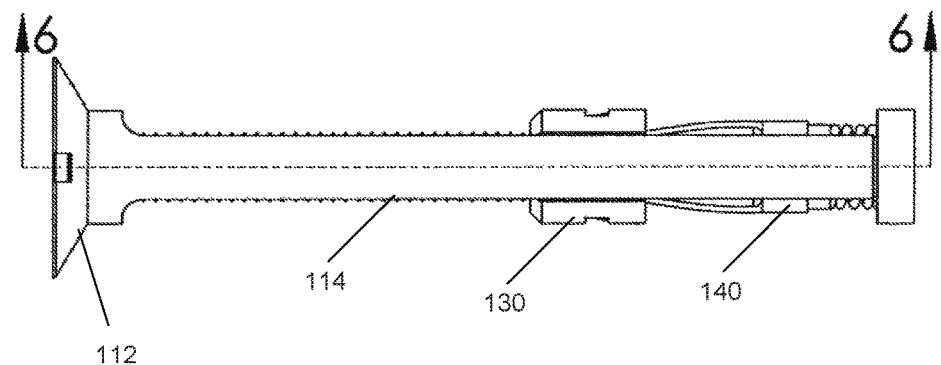
FIG. 4 is a side view of the removable single side fastener showing in FIG. 1 with clamping feet not engaged.
Figure 5:
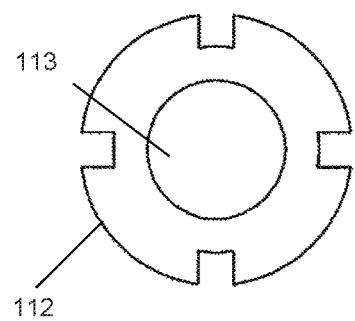
FIG. 5 is a fastener head view of the removable single side fastener showing in FIG. 4.
Figure 6:
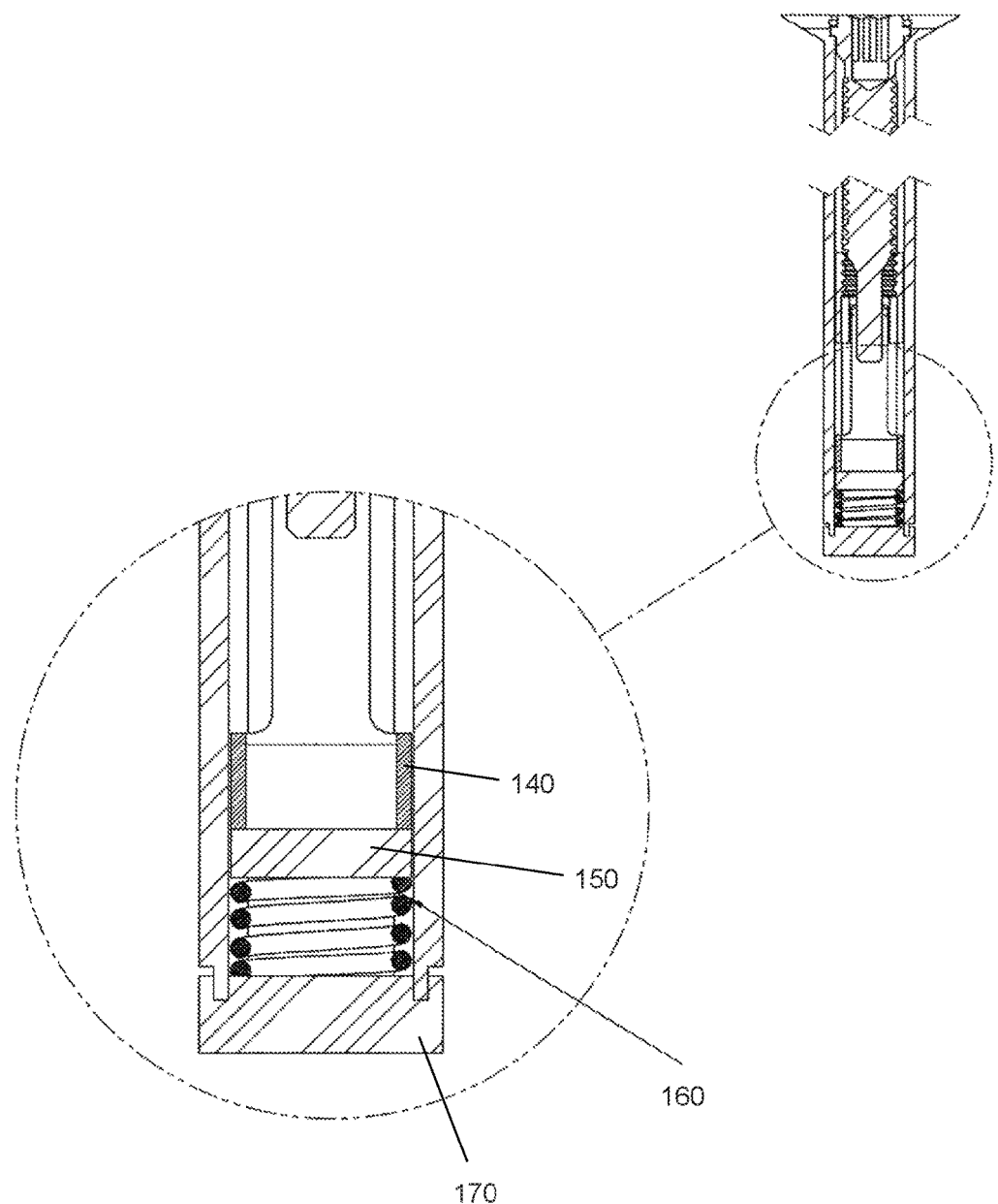
FIG. 6 is a localized cross-sectional view of the removable single side fastener showing the spring being compressed to push collet and drive nut forward.
Figure 7:
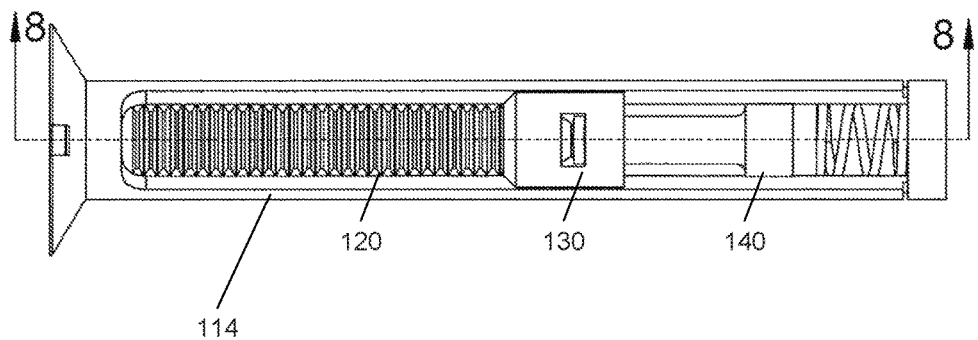
FIG. 7 is a side view of the removable single side fastener showing the spring being compressed to push collet and drive nut forward.
Figure 8:
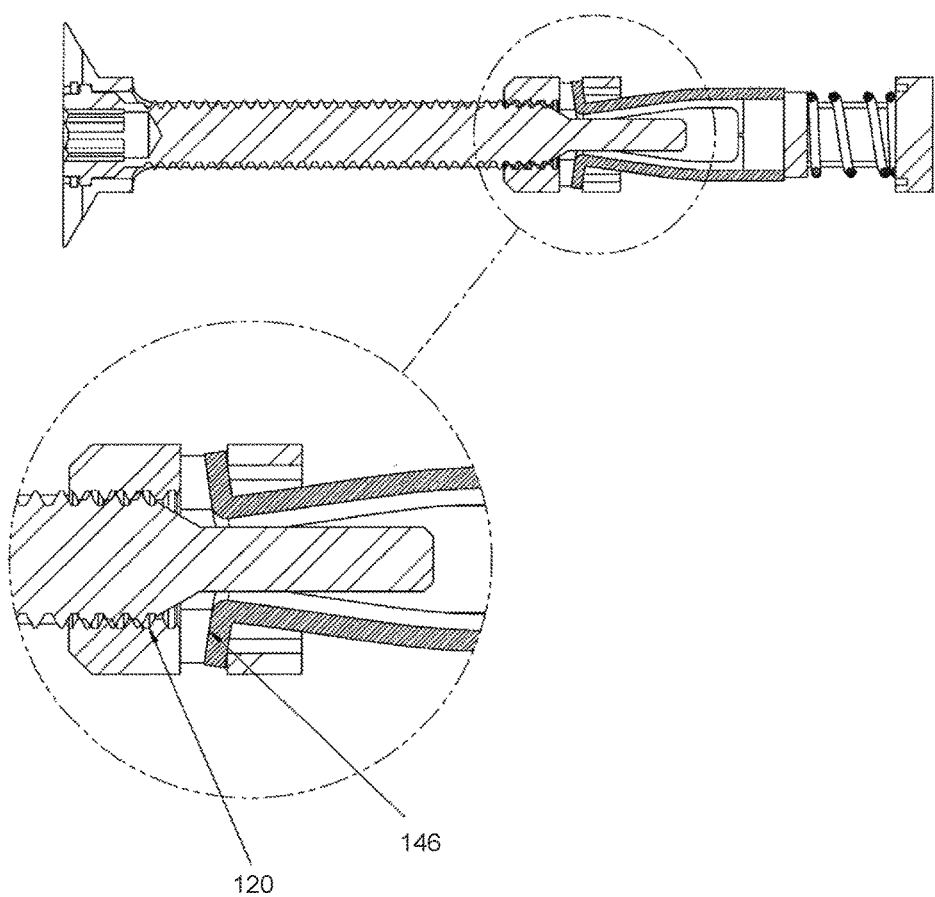
FIG. 8 is a cross-sectional view of the removable single side fastener showing in FIG. 7.
Figure 9:
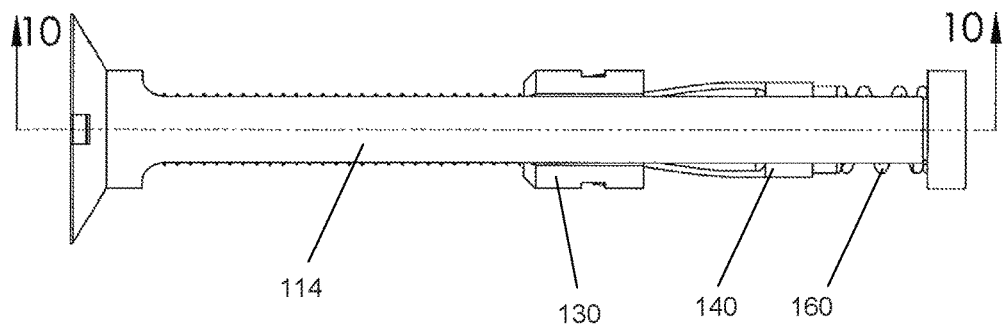
FIG. 9 is an alternative side view of the removable single side fastener showing the spring expanding and keeping cap compressed against collet.
Figure 10:
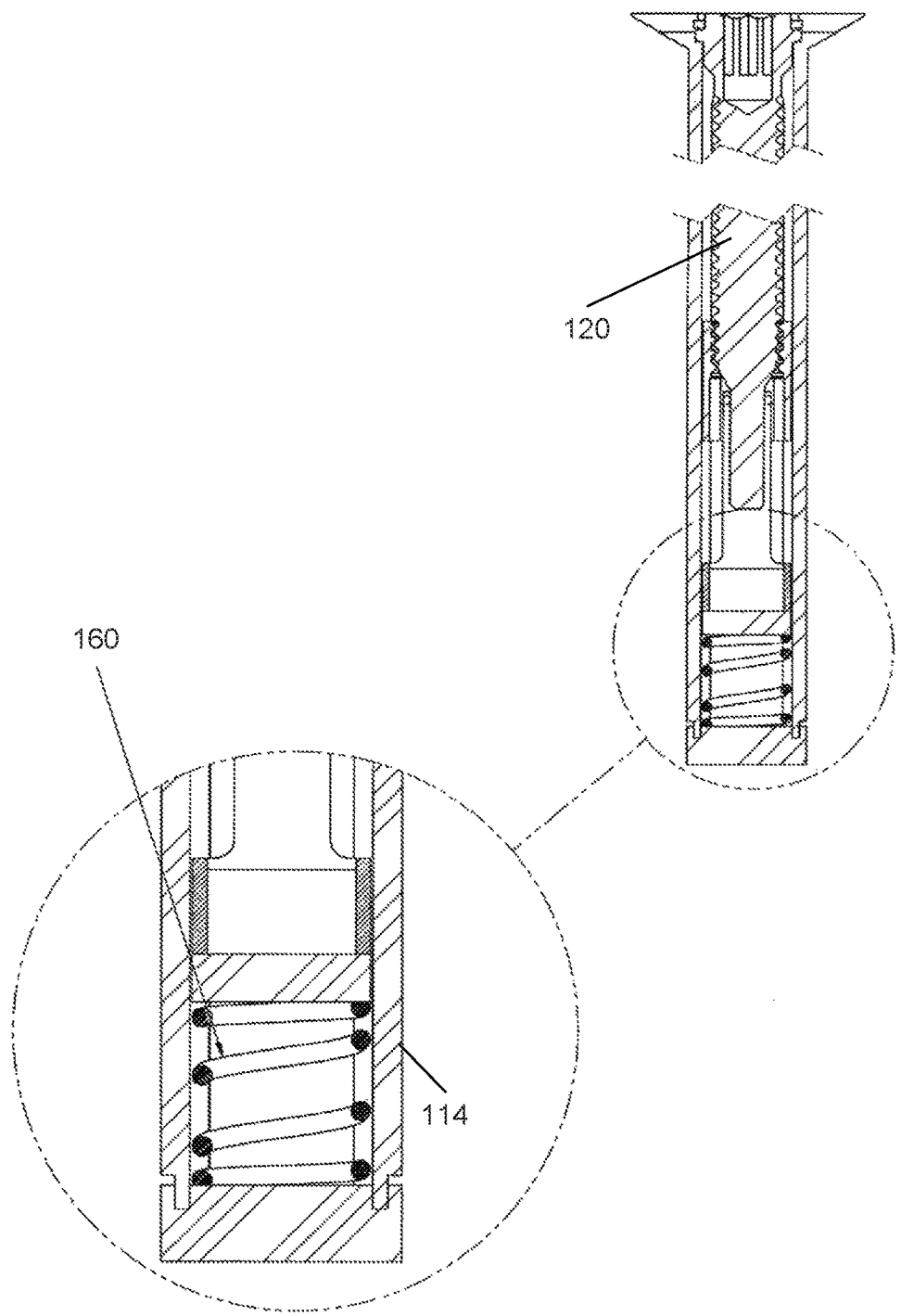
FIG. 10 is a cross-sectional view of the removable single side fastener showing in FIG. 9.
Figure 11:
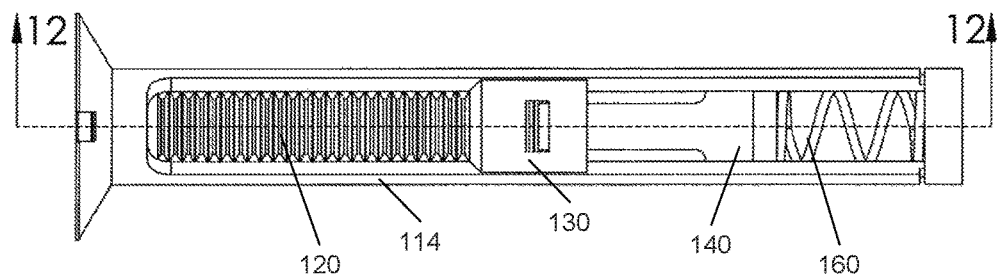
FIG. 11 is a side view of the removable single side fastener with clamping feet engaged.
Figure 12:
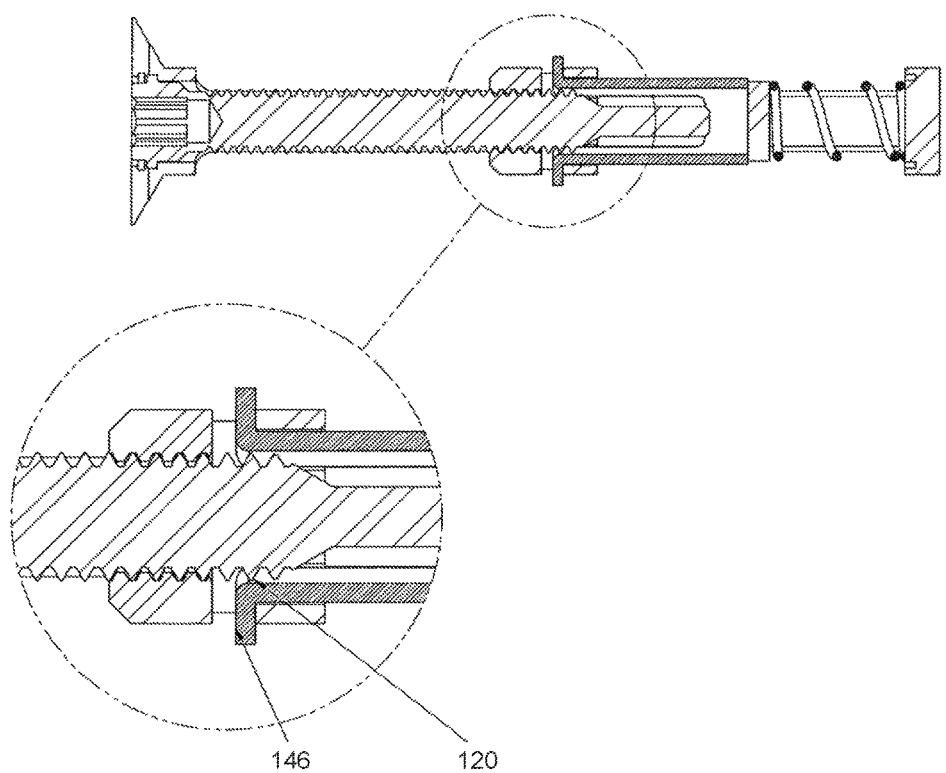
FIG. 12 is a cross-sectional view of the removable single side fastener showing in FIG. 11.
Figure 13:
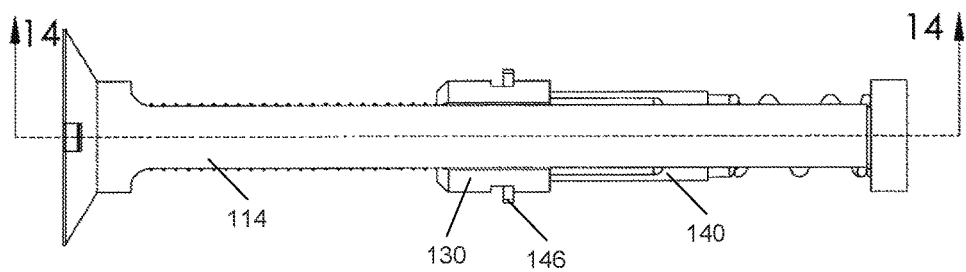
FIG. 13 is an alternative side view of the removable single side fastener with clamping feet engaged.
Figure 14:
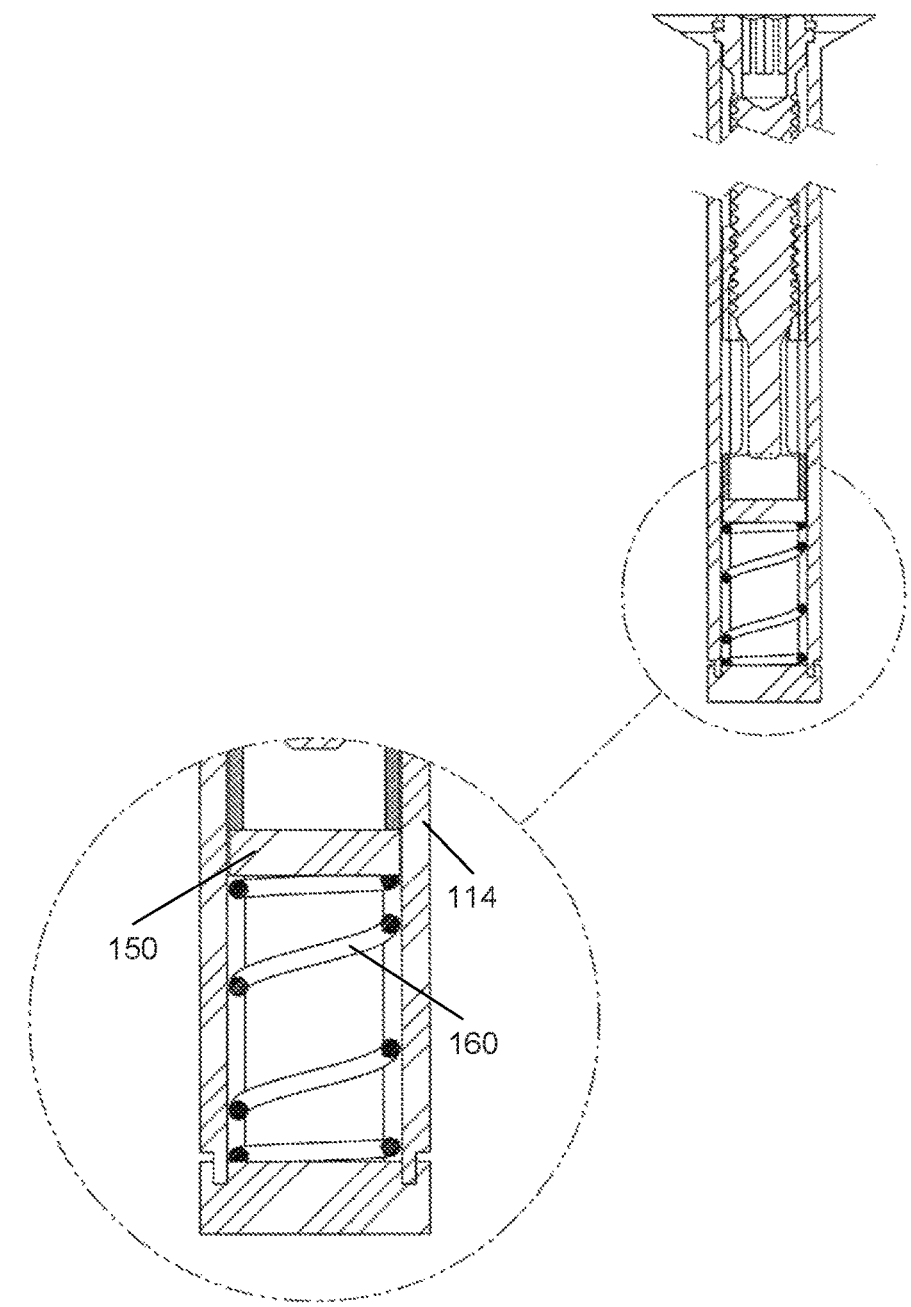
FIG. 14 is a cross-sectional view of the removable single side fastener showing in FIG. 13.

FIGS. 1-3 show an example of a removable single side fastener 100 in various views. Specifically, FIG. 1 is a side view of a collet body; FIG. 2 is an end view from the fastener head; and FIG. 3 is a cross-sectional view.

The removable single side fastener 100 includes a fastener body 110, a screw 120, a drive nut 130, a collet 140, a block 150, a spring 160 and a cap 170. The fastener body 110 is a generally cylindrical housing body having a housing head portion 112 at a proximal end thereof and a shank portion 114 extending distally there from, an outer shank diameter, an inner primary bore diameter and at least two substantially longitudinal slots 115 formed in the shank portion that extend substantially the length of the shank portion. The shank portion 114 has an outer diameter less than any work piece hole diameter. In many examples, the two longitudinal slots are in opposition, i.e., diametrically opposed. Moreover, various examples of the fasteners or assemblies include three or more slots, preferably circumferentially equidistant from each other.

The threaded screw 120 is inserted into the fastener housing body 110. The screw 120 has a head portion 122 at a proximal end thereof and a tip 124 with a reduced diameter portion (which may be threaded or non-threaded) at a distal end thereof. The head portion 122 is preferably, but not necessarily, sized to fit into a recess formed at the housing head portion 112 of the housing body and the screw length is preferably less than the length of the housing body so that when assembled, neither the proximal portion nor the distal portion extend beyond the ends of the housing body. In some examples, the tip 124 has a ramp section 126 with the diameter of the screw decreasing gradually to the tip diameter. In some examples, the head portion 122 of the threaded screw 120 is rotatably confined within the housing head portion 112 by a lock ring 113 (shown in FIG. 25)

The driven nut 130 is rotationally coupled to the threaded screw 120, when the fastener is assembled. The driven nut 130 has an outer surface and an inner surface. The inner surface is adapted to rotationally couple with the threaded screw. The driven nut has a generally cylindrical form but that is rotationally constrained relative to the housing body 110, when associated therewith, by a first part of an anti-rotation means ("ARM") present on an exterior surface thereof. As will be detailed later, this first part of the ARM acts upon a second part of the ARM that forms part of the housing body.

In addition to the foregoing, the driven nut 130 defines at least one pair of radially oriented through holes 132 that are adapted to align with the housing body longitudinal slots 115, thus allowing the through holes to be exposed to the environment exterior of the collet body housing outer surface.

The collet body 140 is operatively linked to the driven nut 130. The collet body includes a collet body base 141 having a central axis and at least a first pair of collet body legs 142 that converge towards the central axis when in a nominal state. The collet body legs 142 define a plurality of collet body slots 144 between the legs. Each leg, in turn, has an extending portion or toe 146, which extends generally radially from the axis of the collet body when the legs are in an axially congruent state. Each toe 146 is sized to fit through a driven nut through hole 132, from the interior of the nut to the exterior. Thus, a portion of the collet body legs 142 are also sized to fit interiorly of the driven nut.

In an assembled state, the screw tip 124 occupies the space between the converging legs 142 such that the maximum outer diameter of the toes 146 is equal to or less than the outer diameter of the driven nut when measured at a pair of through holes. FIG. 3 shows that the drive nut 130 and the screw 120 are not threadably engaged yet. The reduced diameter of the screw tip 124 allows the collet body legs 142 and toes 146 to remain converged. When the nut is run up (towards the proximal end of) the screw, the greater diameter threaded portion of the screw 120 is introduced into the space between the converging legs to cause further displacement there between, whereby the maximum outer diameter of the toes 146 is greater than the outer diameter of the driven nut 130 when measured at a pair of through holes. Preferably, this maximum outer diameter is also greater than the hole diameter of the distal work piece during compressional association of all work pieces.

Because in many examples the substantially longitudinal slots 115 formed in the housing body 110 extend to the distal end thereof, a cap 170 or other termination element is preferably located at the housing body distal end to prevent unintentional loss of the collet body when the fastener is in an assembled state.

Furthermore, because the screw 120 may incorporate a reduced diameter, non-threaded portion (the tip 124) at a distal end thereof, it is possible for the driven nut 130 to decouple from the screw when the nut is run down (toward the distal end of) the screw. To address this possible problem, a biasing element is presented between the housing body (which includes the cap if present) and the driven nut. In many examples, the biasing element, which may be a compression spring 160, is in compressional contact with the collet body, which in turn is in compressional contact with the driven nut 130, preferably via the interaction between the collet body toes and the driven nut through holes.

In another respect, the invention is directed to selected components found in assembled removable single side fasteners having an ultra-low stack height grip range. These components include at least housing bodies 110, collet bodies 140 and driven nuts 130.

As previously described, housing bodies according to the invention have a generally cylindrical form, and include an outer diameter, an inner diameter and at least two substantially longitudinal slots formed therein, preferably opposed to one another and extending substantially the length of the housing body from a proximal end thereof to a distal end thereof. The slots create exposed sectional faces in the housing body, which form one part of a two-part ARM with respect one of the driven nut or the collet body (and preferably the driven nut). This form of an ARM is referred to herein as a sectional ARM. If maximum working range of the fastener is intended, it is desirable to have the slots (and therefore the resulting sectional faces) extend substantially the entire length of the housing body.

It should be noted, however, that the housing body ARM need not exclusively be located on the exposed sectional faces of the housing body; alternative or additional means for modulating driven nut to housing body relative rotation include using a non-circular cross section profile for the inner surface of the housing body (referred to herein as a surface ARM).

FIGS. 4-23 show an example of a removable single side fastener 100 in various views during fastening process.

To facilitate assembly of the fastener and introduction of the collet body 140 into the housing body 110, the distal end of the housing body 110 may be open initially. In this manner, the collet body 140 and optional biasing element 160, such as the compression spring, may be introduced into the housing body where after the assembly may be permanently (e.g., swaged, adhered, welded, structurally glued, etc.) or semi-permanently (e.g., screwed) closed with the end cap 170.

Figure 24:
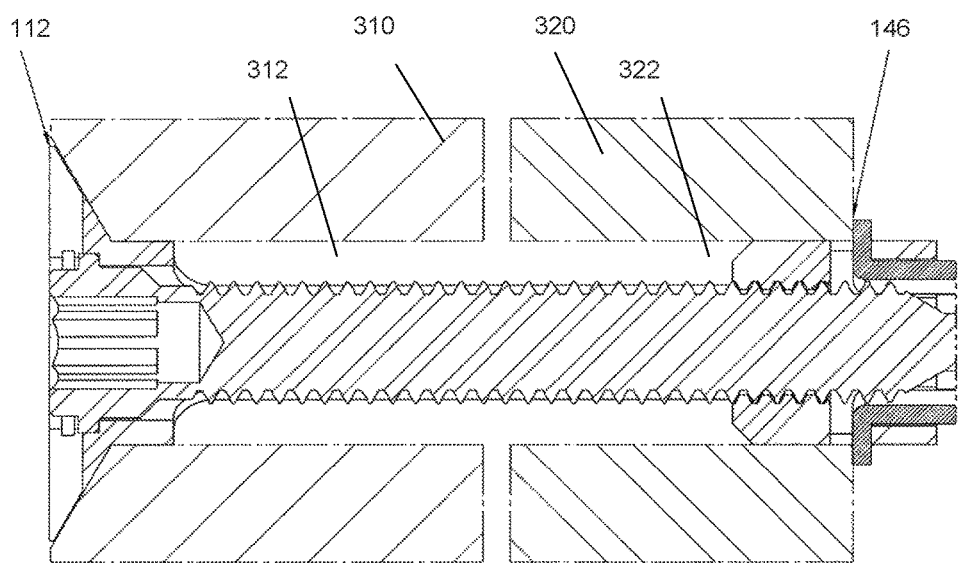
FIG. 24 is a side view of the removable single side fastener with expanded clamping feet and ready to clamp two working pieces.
Figure 25:
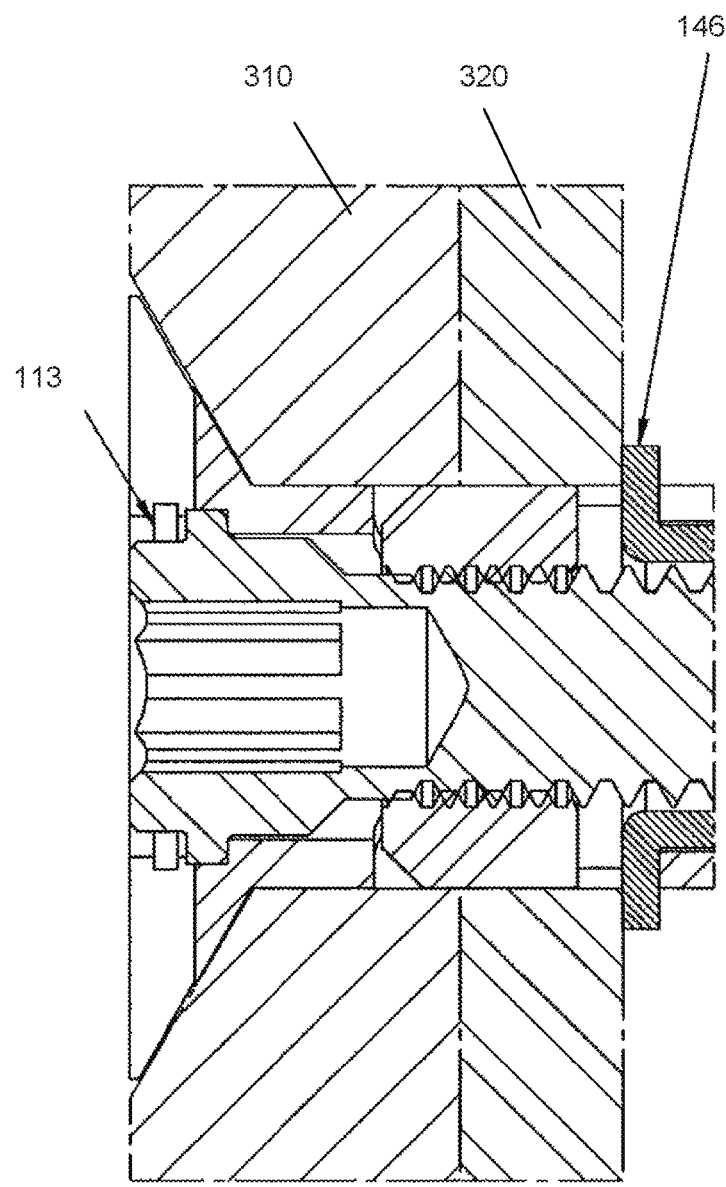
FIG. 25 is a side view of the removable single side fastener with two working pieces clamped together.

Depending upon applications, the proximal end of the housing body may have a beveled head so as to fit within a beveled recess formed in the proximal work piece 310 (showing in FIGS. 24-25). The fastener housing body is inserted through a proximal work piece hole 312 in the proximal work piece 310 and a distal work piece hole 322 in the distal work piece 320. The proximal work piece hole 312 has a beveled recess such that the housing head 112 is flush with the proximal work piece 310 when fastening process finished. Therefore, an ultra-low profile or flush head temporary fastener can be created. Additionally, the beveled head can have a conventional cylindrical bore 113 formed therein to receive a conventional cap head screw head 122. By rotating the screw head 122 instead of the housing, rotational abrasion between the housing head portion 112 and proximity workpiece may be avoided. To prevent rotation of the housing body during clamping operations, one or more tool interfaces can be formed in the beveled head to receive a tool that will prevent unintentional rotation of the housing body.

Before the screw 120 and the driven nut 130 threadably engaged, the compression spring 160 pushes (directly or via a block 150) the collet body 140 and thus the driven nuts 130 against the screw tip 124. Such a compression enables or facilitates an initial thread engagement between the driven nuts 130 and the screw 120. After the thread engagement is established, the screw 120 may be rotated by rotating a drive interface 123 on the screw head 122. Since the driven nut 130 is rotatably constrained relative to the housing body 110, the driven nut 130 moves longitudinally along the housing body longitudinal slots 115 toward the housing head portion 112 when the screw 120 is rotated further. Such a longitudinal movement of the driven nut 130 will also drag the collet body 140 to move toward the housing head portion 112 and force the collet body legs 142 diverge outwards (by the screw 120) to protrude the toes 146 out of the driven nut through holes 132.

Figure 15:
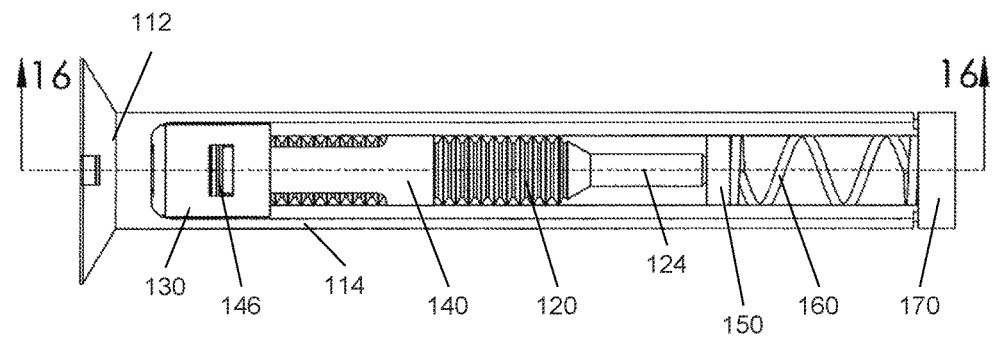
FIG. 15 is a side view of the removable single side fastener with clamping feet moved to a maximum position of a clapping range.
Figure 16:
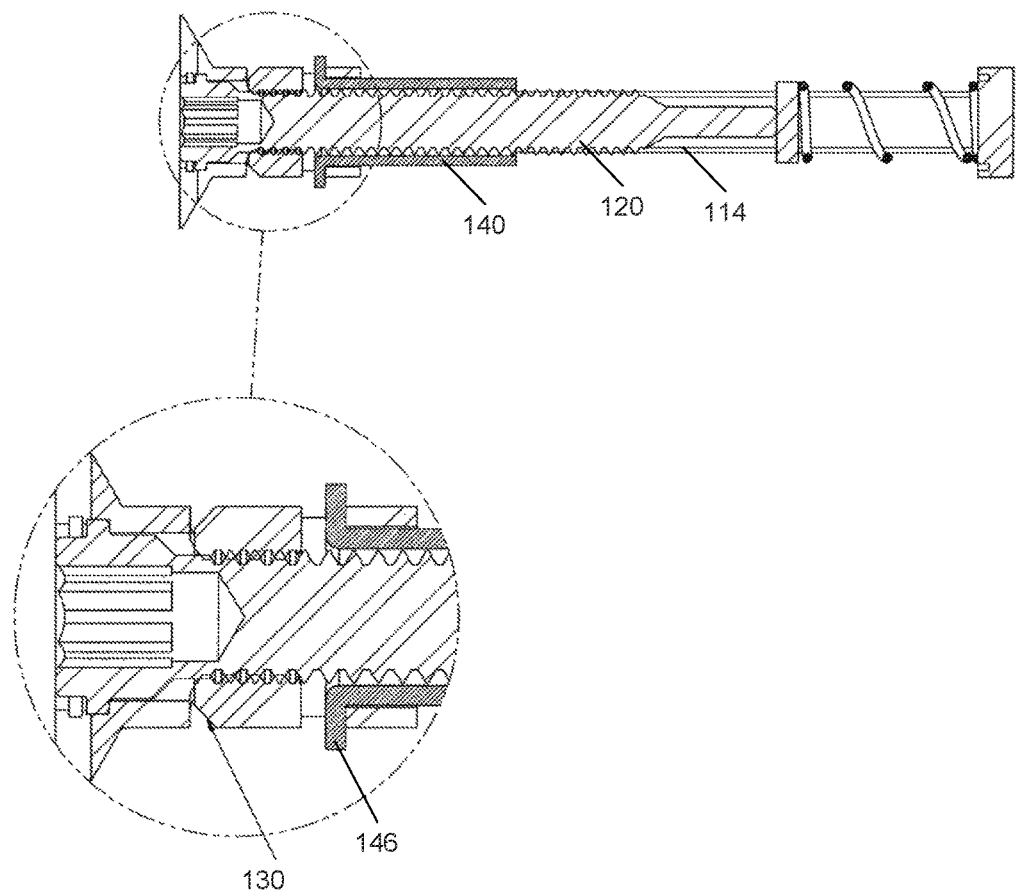
FIG. 16 is a cross-sectional view of the removable single side fastener showing in FIG. 15.
Figure 17:
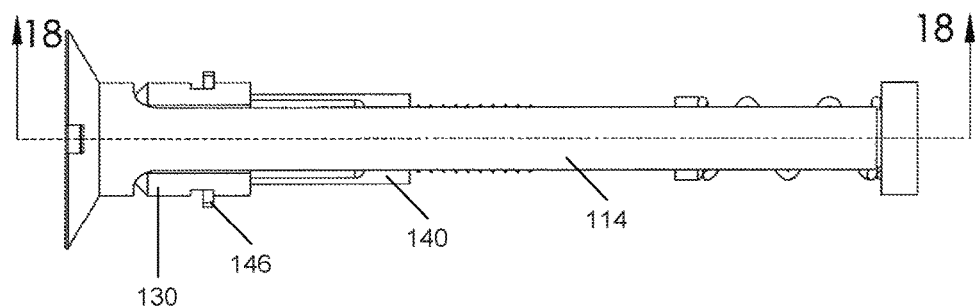
FIG. 17 is an alternative side view of the removable single side fastener with clamping feet moved to a maximum position of a clapping range.
Figure 18:
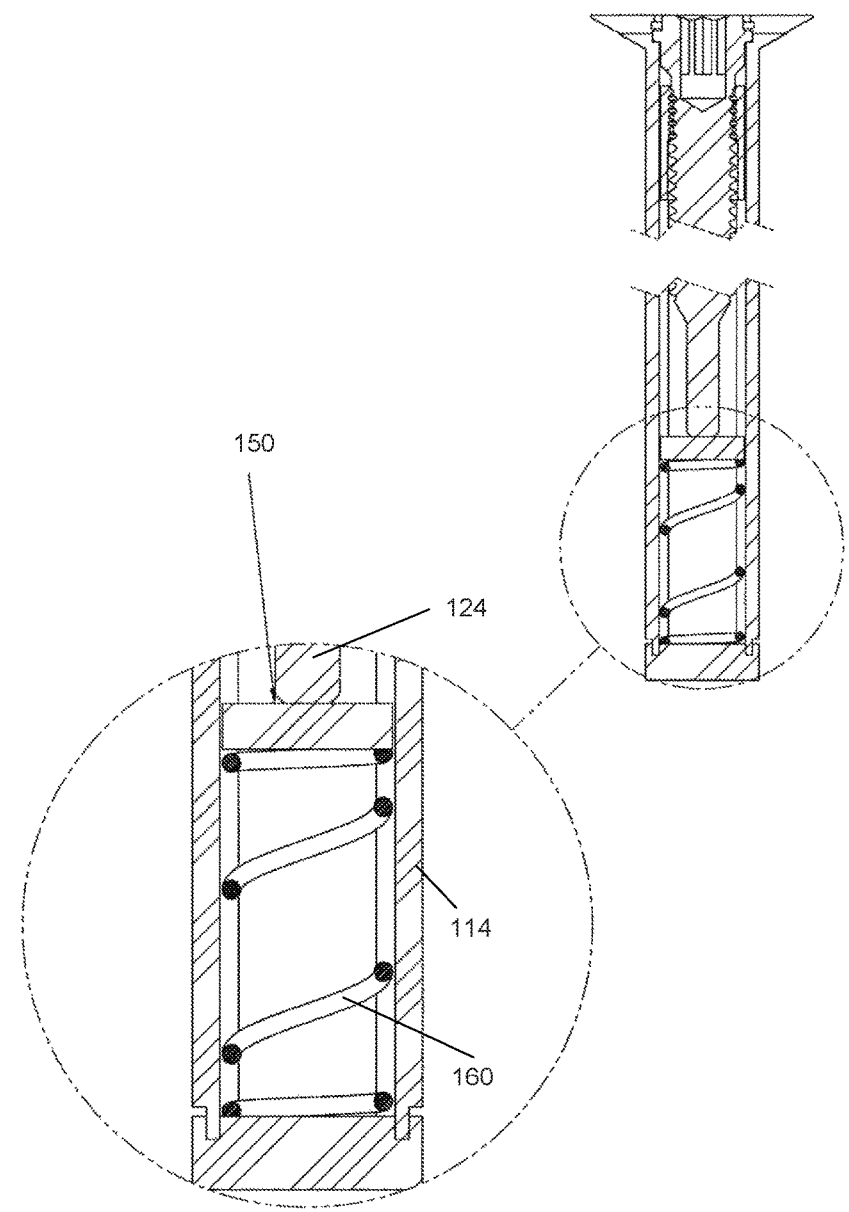
FIG. 18 is a cross-sectional view of the removable single side fastener showing in FIG. 17.
Figure 19:
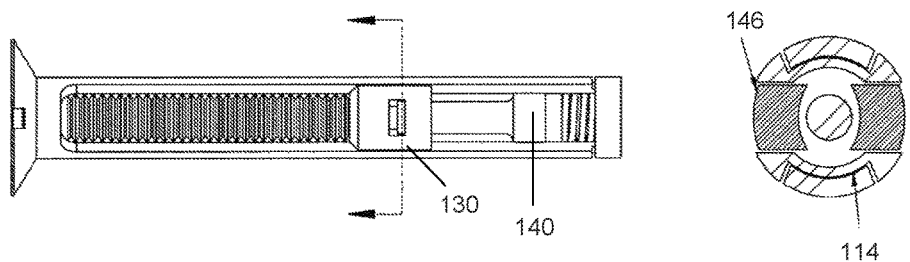
FIG. 19 is a side view and a cross-sectional of the removable single side fastener showing clamping feet before engagement.
Figure 20:
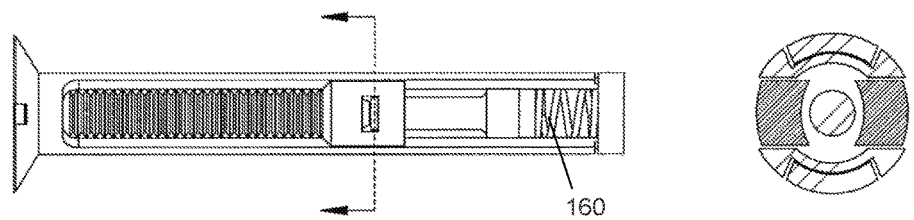
FIG. 20 is a side view and a cross-sectional of the removable single side fastener showing screw tip touching and ready to expand the clamping feet.
Figure 21:
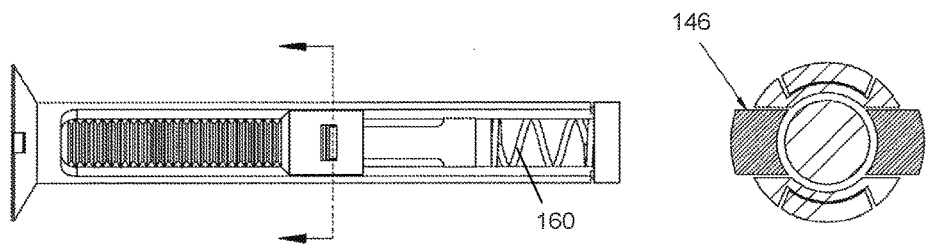
FIG. 21 is a side view and a cross-sectional of the removable single side fastener showing clamping feet being expanded.
Figure 22:
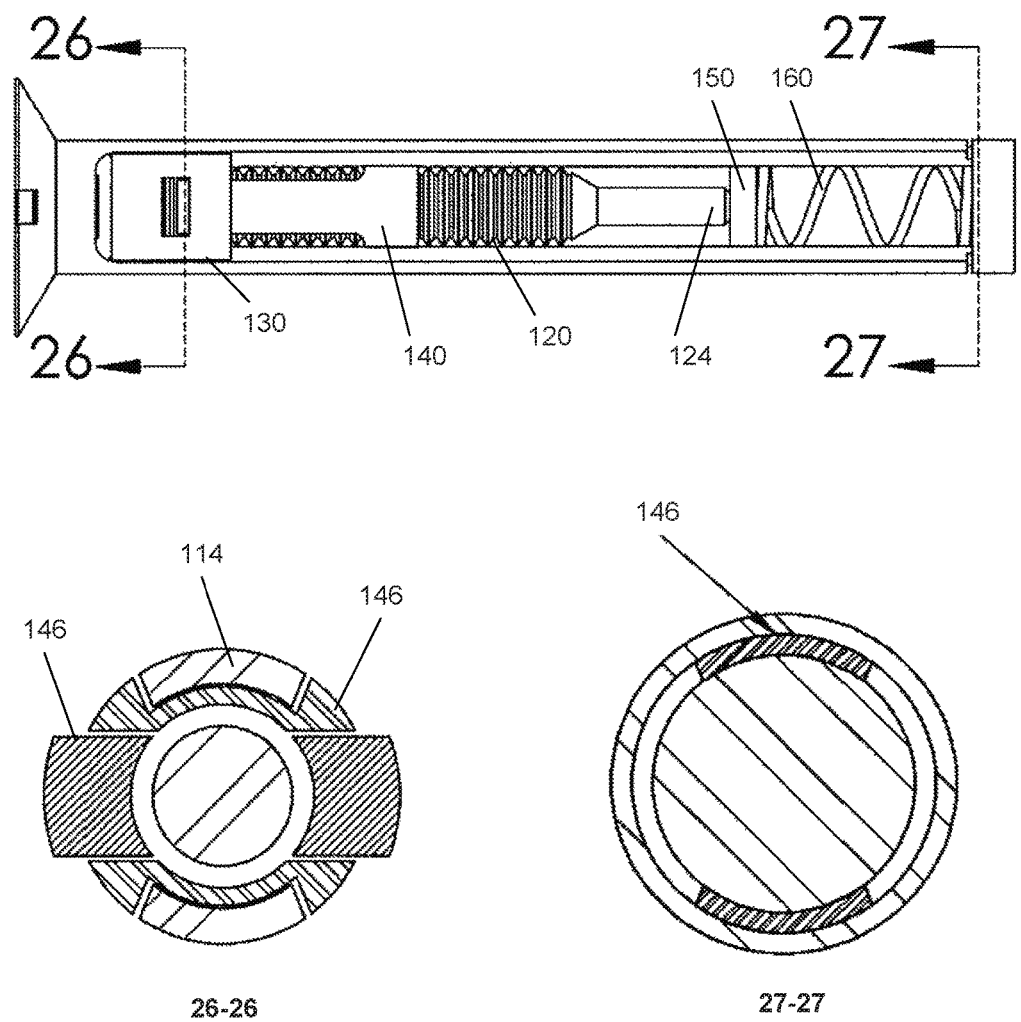
FIG. 22 is a side view and a cross-sectional of the removable single side fastener with the clamping feet at a maximum position of a clapping range for ultra-low stack height grip.
Figure 23:
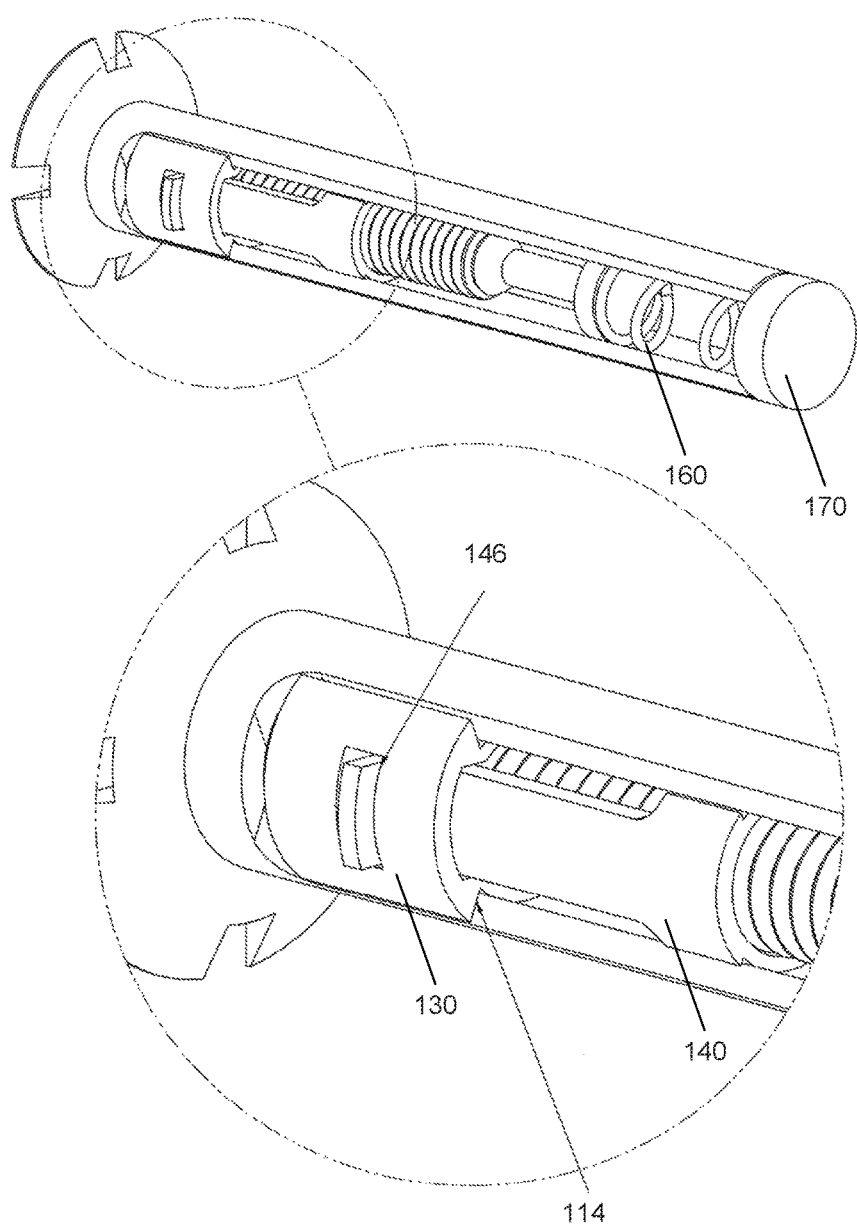
FIG. 23 is an isometric view of the removable single side fastener with the clamping feet at a maximum position of a clapping range.

With the collet body 140 moving longitudinally toward the housing head portion 112, the spring 160 starts expanding and pushes the block 150 to touch the screw tip 124, which corresponds to the moment that the block 150 decoupling to the collet body 140. In some examples, even when the spring 160 expands to the position with the block 150 touching the screw tip 124, the spring 160 is still in a compressed stage, although being compressed less, in order to hold the block 150 in position (as shown in FIG. 15).

When the driven nut 130 moves longitudinally and starts touching the housing head portion 112 (or the root of the shank portion 114), the collet body 140 reaches a maximum position of a clapping range. The maximum position is defined as the maximum movable position of the collet body 140 beginning from the position where the driven nut 130 and the screw 120 just threadably engages. Therefore, when the collet body 140 reaches the maximum position, the fastener 100 actually has a minimum stack clapping distance. With such a configuration that the collet body 140 may be moved to touch the housing head portion 112, the fastener 100 may be used to clap workpieces with ultra-low stack height.

FIGS. 24-25 show side views of the removable single side fastener with two working pieces clamped together between the housing body head 112 and the protruded toes 146. The housing body head portion 112 may be a beveled head so as to fit within a beveled recess formed in the proximal work piece 310. Therefore, an ultra-low profile or flush head temporary fastener can be created. Additionally, the beveled head can have a conventional cylindrical bore 113 (shown in FIG. 29) formed therein to receive a conventional cap head screw head 122. By rotating the screw head 122 instead of the housing, rotational abrasion between the housing head portion 112 and proximity workpiece may be avoided. To prevent rotation of the housing body during clamping operations, one or more tool interfaces can be formed in the beveled head to receive a tool that will prevent unintentional rotation of the housing body.

Figure 26:
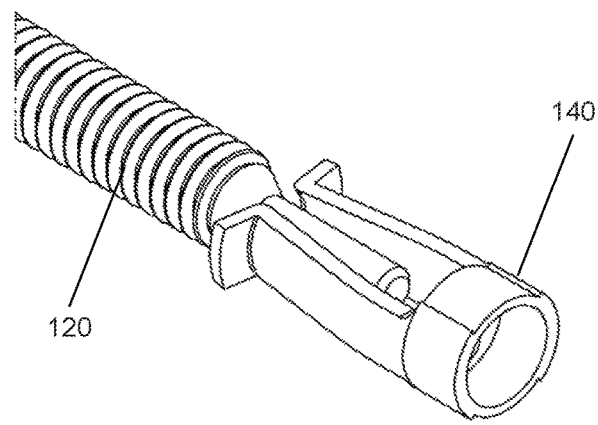
FIG. 26 is a localized isometric view of the screw tip and collet body before the clamping feet expanded.
Figure 27:
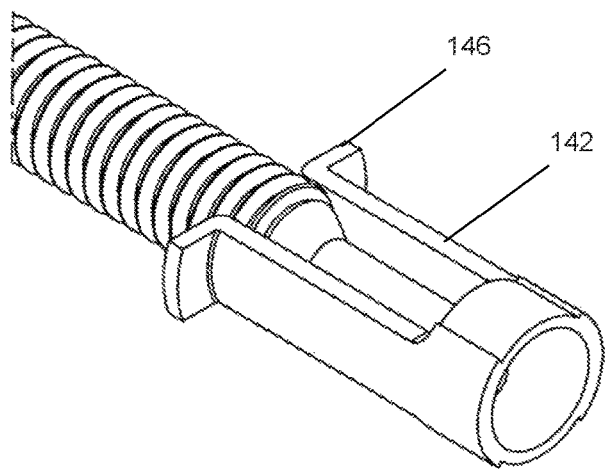
FIG. 27 is a localized isometric view of the screw tip and collet body with the clamping feet expanded.
Figure 28:
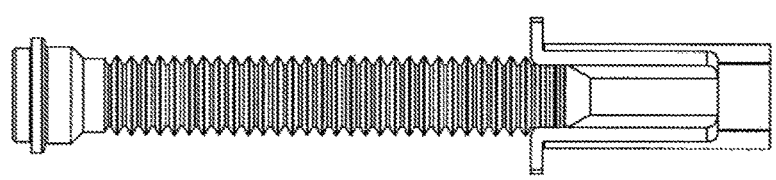
FIG. 28 is a localized side view of the screw tip and collet body with the clamping feet expanded.
Figure 29:
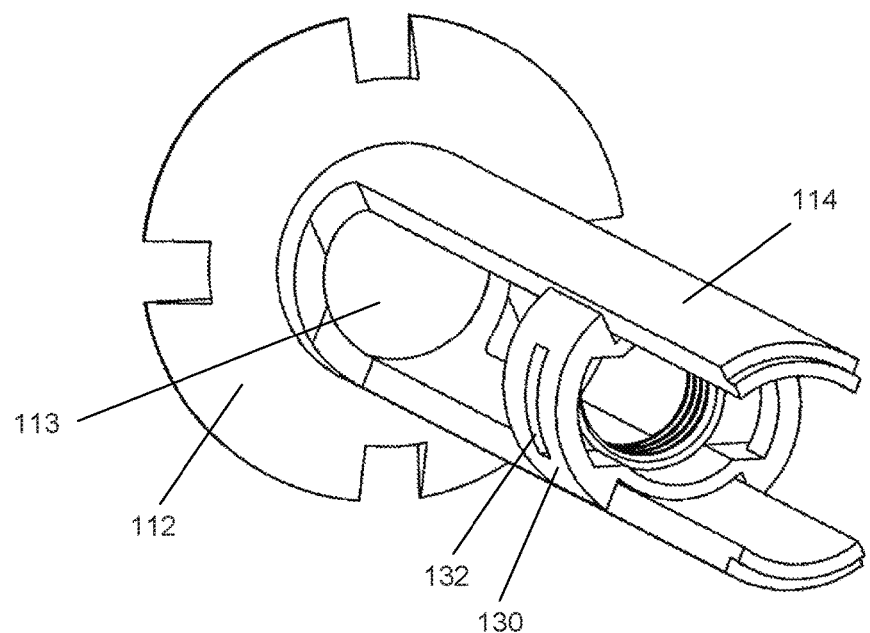
FIG. 29 is a localized isometric view of the fastener body and the drive nut.
Figure 30:
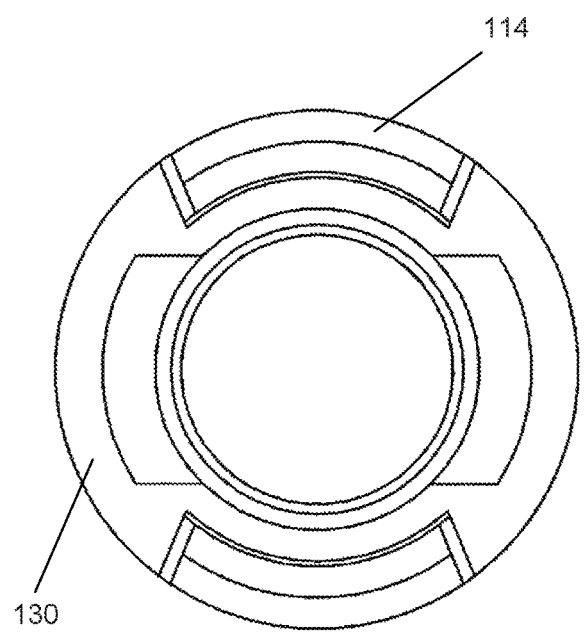
FIG. 30 is an end view of the fastener body and the drive nut.
Figure 31:
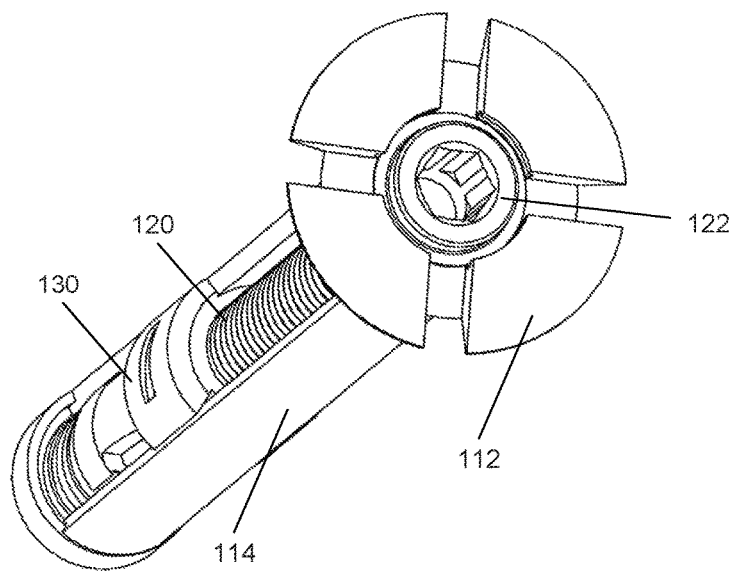
FIG. 31 is a localized isometric view of the fastener body, the screw and the drive nut.
Figure 32:
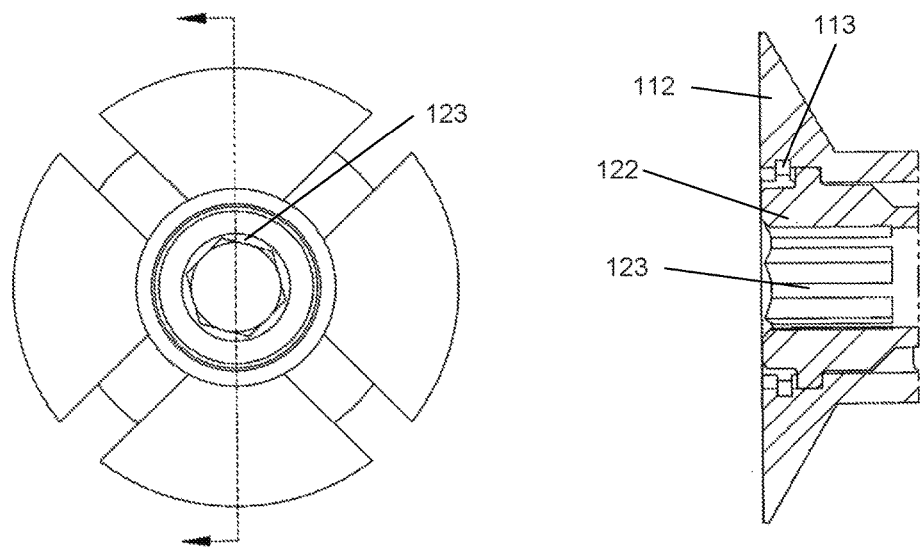
FIG. 32 is an end view and a cross-sectional of the fastener body head.

FIG. 26-32 show various localized isometric view of selected components for better clarification and functional view of the fastener. Specifically, FIG. 26 is a localized isometric view of the screw tip and collet body before the clamping feet expanded. FIG. 27 is a localized isometric view of the screw tip and collet body with the clamping feet expanded. FIG. 28 is a localized side view of the screw tip and collet body with the clamping feet expanded. FIG. 29 is a localized isometric view of the fastener body and the drive nut. FIG. 30 is an end view of the fastener body and the drive nut. FIG. 31 is a localized isometric view of the fastener body, the screw and the drive nut. FIG. 32 is an end view and a cross-sectional of the fastener body head.

In some examples, the threaded screw 120 may engage the collet body 140 directly. For example, the collet body base 141 may be threaded to engage the threaded screw 120. The collet body 140 may be disposed in an opposite direction as disclosed in the aforementioned examples, with the collet body base 141 facing the threaded screw 120. The collet body legs 142 and extending portion toes 146 are coupled to the drive nut 130 in a similar way to the aforementioned examples. By such configurations, the drive nut 130 may not be threaded as it will be dragged by the collet body (more specifically the toe) to move longitudinally toward the housing head 112.

With respect to methods for using temporary fasteners according to the invention, such methods include ensuring that the screw contacting portions of the collet body legs are in the reduced diameter portion of the screw such that the toes are in a retracted position; inserting the distal end of the fastener through all work piece holes; rotating the screw so that the driven nut is caused to translate towards the proximal end of the fastener, whereby the collet body legs are radially displaced, causing the collet body toes to transition to an extended position; and continuing to cause the driven nut to translate towards the proximal end of the fastener until compressive contact is made between the collet body toes and the distal work piece.

Those skilled in the art will realize that the single side fastener can be constructed with various configurations. For example a single side fastener may be configured other than disclosed in the aforementioned examples. Those skilled in the art will also realize that a single side fastener may further incorporate different components. The foregoing description of the invention has been described for purposes of clarity and understanding. Various modifications may be implemented within the scope and equivalence of the appended claims.

The invention claimed is:

1. A fastener comprising:
a housing body having a housing head portion and a shank portion extending from the housing head portion, the shank portion forming at least two longitudinal slots;
a threaded screw inserted into the housing body, the threaded screw having a head portion rotatably confined within the housing head portion;
a drive nut having at least a pair of radially oriented through holes rotationally coupled to the threaded screw and rotationally constrained relative to the housing body; and
a collet body operatively linked to the driven nut, the collet body comprising a collet body base having a central axis and at least a pair of collet body legs converging towards the central axis, each collet body leg having a toe extending radially outward and through the through hole by the threaded screw when the threaded screw threadably engages the drive nut and rotates to causes the drive nut moving longitudinally toward the housing head portion, the radially extended toe compressing work pieces against the housing head portion for fastening.

2. The fastener of claim 1, wherein the fastener further comprises a spring in compressional contact with the collet body to facilitate thread engagement between the drive nut and the threaded screw.

3. The fastener of claim 2, wherein the spring compresses the collet body via a block.

4. The fastener of claim 2, wherein the spring is confined by an end cap located at a distal end of the shank portion.

5. The fastener of claim 1, wherein the pair of radially oriented through holes are aligned with the housing body longitudinal slots.

6. The fastener of claim 1, wherein the threaded screw comprises a screw tip with a reduced diameter in reference to the threaded screw.

7. The fastener of claim 6, wherein the screw tip further comprises a ramp section with a ramp diameter decreasing gradually to the reduced diameter.

8. The fastener of claim 6, wherein the screw tip is sized to fit into the collet body legs before the collet body legs are expanded radially outward.

9. A fastener comprising:
a housing body having a housing body head and at least two longitudinal slots;
a drive nut having a pair of radially oriented through holes;

a threaded screw rotatably confined within the housing body;

a collet body disposed within the housing body and coupled to the threaded screw, the collet body rotationally constrained relative to the housing body and slidably moveable along the longitudinal slots, the collet body comprising at least a pair of collet body legs biased in converging inwardly, each collet body leg having a toe which is pushed radially outward through the through holes beyond the longitudinal slots by the threaded screw when the threaded screw moves into the collet body legs, the radially extended toe compressing work pieces against a housing head portion for fastening.

10. The fastener of claim 9, wherein the threaded screw comprises a screw tip with a reduced diameter in reference to the threaded screw.

11. The fastener of claim 10, wherein the screw tip is sized to fit into the collet body legs before the collet body legs are expanded radially outward.

* * * * *